June 17, 1924.
F. J. POWERS ET AL
1,498,118
TRANSMISSION FOR AUTOMOBILES
Filed May 29, 1922
2 Sheets-Sheet 1
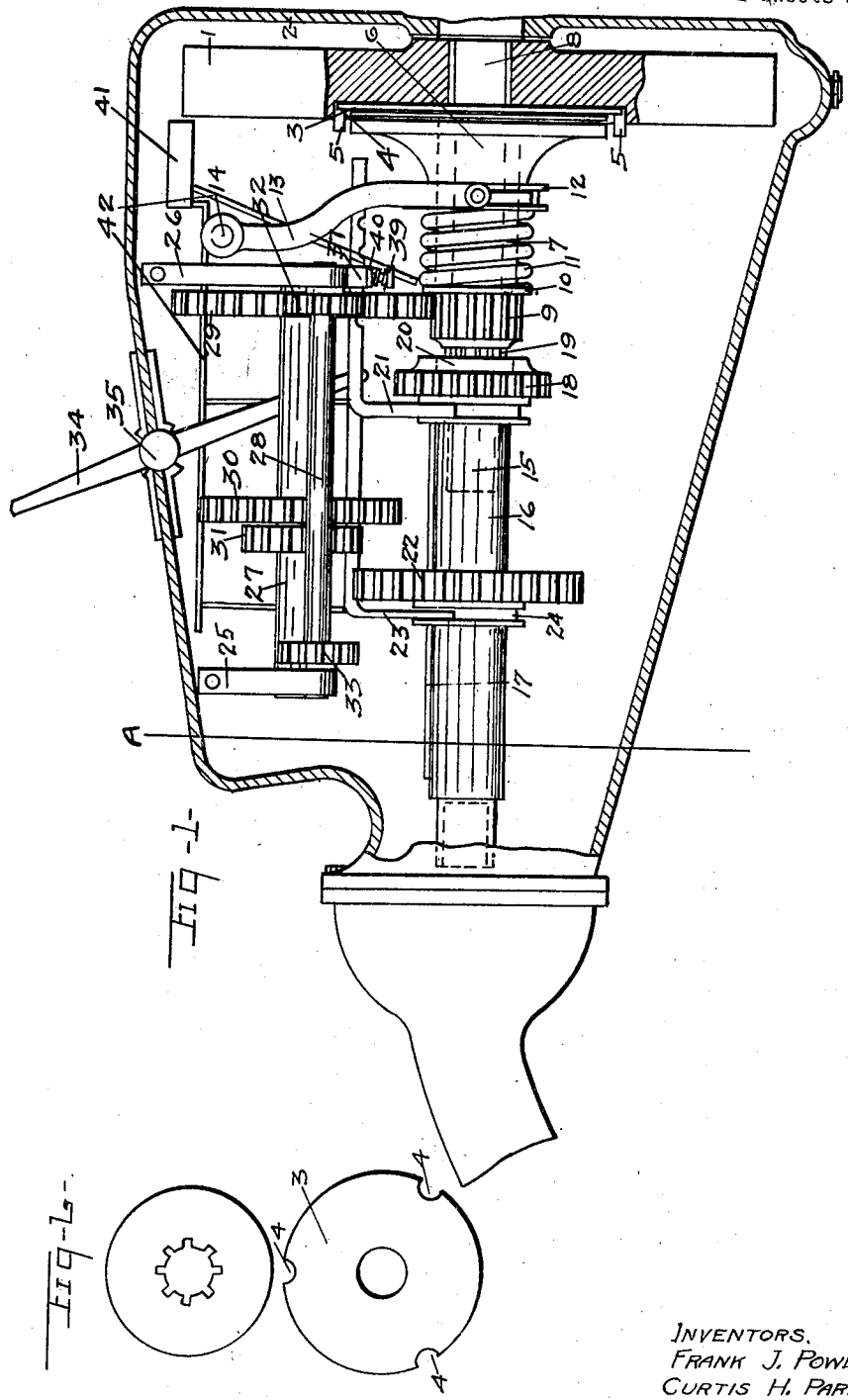
INVENTORS.
FRANK J. POWERS.
CURTIS H. PARRISH.
JAMES E. O'HANLON.
By David E. Lofgren
ATTORNEY June 17, 1924.
F. J. POWERS ET AL
1,498,118
TRANSMISSION FOR AUTOMOBILES
Filed May 29, 1922
2 Sheets-Sheet 2
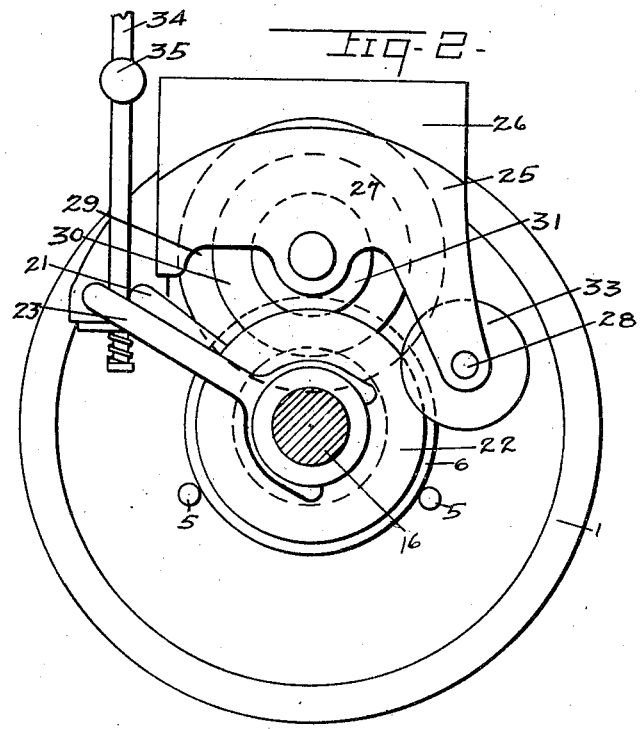
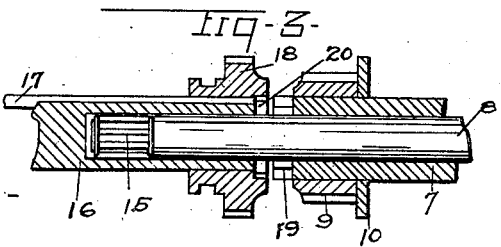
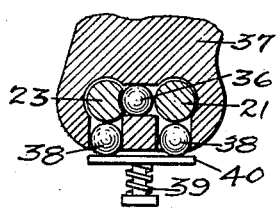
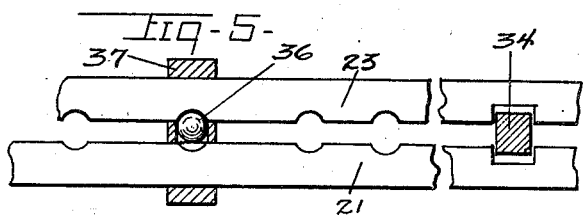
INVENTORS
FRANK J. POWERS.
CURTIS H. PARRISH.
JAMES E. O'HANLON.
BY David C. Lofgren
ATTORNEY.

Patented June 17, 1924.

1,498,118

UNITED STATES PATENT OFFICE.

FRANK J. POWERS, CURTIS H. PARRISH, AND JAMES E. O'HANLON, OF PORTLAND, OREGON.

TRANSMISSION FOR AUTOMOBILES.

Application filed May 29, 1922. Serial No. 564,550.

*To all whom it may concern:*

Be it known that we, FRANK J. POWERS, CURTIS H. PARRISH, and JAMES E. O'HANLON, all citizens of the United States, residing at Portland, in the county of Multnomah and State of Oregon, have invented a new and useful Transmission for Automobiles, of which the following is the specification.

Our invention relates to a gear transmission installed in automobiles, to change the speed of the machine and to reverse the motion as well.

The objects of our invention are; to provide a gear transmission operated by a lever in such manner that all shifting can be made with one hand by moving said lever; to provide shaft brackets which can be installed in the gear housing to carry the counter shaft and the reverse shaft; to provide a lock in the gear shifting arms, such that only one of the shifting arms can be operated at the same time; to install a socket in the housing of the gears to carry the actuating ball of the operation lever; to provide a friction to prevent the gear shifting arms and fingers from moving under the vibration of the machine; to install a drive shaft carrying a movable gear which will engage with the drive shaft of the engine and deliver the motion thereof direct to the wheels; to install an oiler within the gear housing which will collect the oil when the apparatus is in motion and conduct the same to the bearings.

We attain these objects by the mechanism illustrated in the accompanying drawings, in which:

Figure 1 is an elevational view of the gears with the gear housing in section and the fly-wheel partly in section. Figure 2 is an elevational view of the gears without the gear housing, taken along the line "A" in Figure 1, looking to the front. Figure 3 is a sectional view of the main drive shaft, showing the manner in which the movable gear is mounted on the same and provided with a socket to engage with the male member of the clutch. Figure 4 is a sectional view of that portion of the counter shaft bracket, which is provided to carry the gear shifting arms, the ball lock and friction being provided in the manner shown within. Figure 5 is a plan view of the gear shifting arms with the bracket in section and the locking ball shown in place between the arms. Figure 6 are plan views of the clutch plates, the upper which is held in the flywheel and the lower being mounted in the drive shaft at the center.

Similar numerals refer to similar parts throughout the several views.

The fly-wheel 1 is directly connected to the crank-shaft of the engine, but is installed within the gear housing 2. The plate 3 is set in the fly-wheel in the manner shown in Figure 1, and the sections 4 are provided in the circumference of the plate to fit about the pins 5 set in the fly-wheel, in order that the plate may move with the rotation of the wheel.

The shaft 8 carrying the flywheel, extends through the shaft 7 and enters a bearing provided in the end of the shaft 16. All parts except the flywheel are free to rotate on the shaft 8 as said shaft forms a bearing only. This will be seen by the inner dotted line in Figure 1 of the drawings. The shaft 7 rotates about the shaft 8, being constructed as a sleeve, and having the pinion 9 fastened thereto. The clutch ring 12 is keyed but movable along the sleeve 7 caused by the action of the lever 13 and the spring 11. When the clutch is in operation, the spring 11 forces the clutch members together. In this case the flywheel forms one member of the clutch and delivers the motion to the sleeve 7.

The clutch 6 is mounted on the shaft 7 which is free to rotate about the shaft 8 inserted within. The pinion 9 is pressed and keyed on the shaft 7 and the shoulder 10 is provided as a rest for the clutch spring 11 which is coiled about the shaft 7. The clutch ring 12 is built on the movable member of the clutch and the fingers of the clutch operating arm 13 are assembled in the groove provided in the ring. With the clutch arm mounted on the shaft 14 which extends through the housing and connected to the foot pedal, it will be understood how the movable member of the clutch can be operated against the clutch spring.

Roller bearings 15 are mounted on the end of the shaft 8 which is inserted in the shaft 16 in the manner shown in Figure 3, which forms a bearing for both shafts. The key 17 is fitted in a groove provided in the shaft 16 and extends the entire length thereof. The gear 18 is mounted on the shaft 16 and made subject to move longitudinally thereon.

On the end of the shaft 7, the male member of the clutch 19 is provided and aligned to engage with the female member 20 which is built in the gear 18 as shown in Figure 3 of the drawings.

The shifting fingers 21 are assembled in the groove provided for the same on the rear of the gear 18, and it will be seen how the parts forming the clutch at that point can be made to operate. With the clutch engaged, the shafts 7 and 16 rotate the same and this creates the high gear of the machine.

A second gear 22 is mounted on the shaft 16, subject to rotate therewith and movable longitudinally in the same manner as the gear 18. The shifting fingers 23 are assembled in the groove 24, and govern the sliding motion of the gear along the shaft.

Two brackets 25 and 26 are installed in the gear housing and held in place by bolts inserted through the housing at the proper points. The brackets are provided to carry the counter shaft 27 and the reverse shaft 28. Gears 29, 30 and 31 are mounted on the counter shaft and keyed to rotate with the same. These gears are of different sizes, as will be seen by Figure 1 of the drawings, the arrangement being to provide for the different speeds of the machine. Two gears 32 and 33 are mounted and keyed to the reverse shaft 28, the gear 32 being assembled to fall in mesh with the gear 29 at all time.

The gear 29 is in mesh with the pinion 9, through which the motion is delivered to the counter shaft and all gears mounted thereon.

When the gear 18 is moved to mesh with the gear 30 on the counter shaft, intermediate speed is delivered to the wheels of the machine, it being understood that clutch member in the gear 18 will move with the gear and away from the male member with which it is made to engage. When the gear 22 is moved to mesh with the gear 31 on the counter shaft, low speed is delivered to the wheels of the machine, and when said gear 22 is moved to mesh with the gear 33 on the reverse shaft, a reverse motion is delivered to the wheels. The movement above described can be seen from Figure 1 of the drawings.

The gear shifting lever is mounted in a bearing provided in the top of the engine housing, the handle thereof being extended through the floor of the car to a point where the same can be operated by the driver. The ball and socket joint forms the actuating point of the lever which extends into the gear housing and engages with the gear shifting arms 21 and 23. There are slots in each of the shifting arms, and when all gears are in the neutral position, the end of the lever falls between the arms and in the slots provided, as shown in Figure 5. Neither of the shifting arms can be moved while the lever 34 is engaged with both in the manner shown in Figure 5. In such case the ball 36 would lock both arms from moving the bracket 37. This is provided so that only one gear can be shifted at a time.

The bracket 37 is built onto counter shaft bracket 26, extending clear from all gears as shown in Figure 2 of the drawings. The balls 38 are compressed against the shifting rod or arms, by the spring 39 acting on the plate 40, in the manner shown in Figure 4.

When it is desired to shift the gears, the lever is moved to the side of the proper shifting arm, and thus is disengaged from the remaining arm as will be seen by Figure 5. When the lever is in this position, the arm with which it is engaged, can be moved longitudinally in the bracket 37, the ball lock being moved to the circular portion of the arm which is stationary during the operation. From the last description, it will be seen how only one shifting lever can be moved at the same time. It will also be seen that all gears in mesh will have to be moved to neutral, before the lever can engage in the slot of the remaining lever to operate the same.

All the gears run in oil, the housing being so provided as to hold oil for the mechanism to operate in. A catch pan 41 is installed in the housing with any number of conductors 42 leading the oil to the various bearings about the gears and shafts. The oil is collected in the pan or collector when the gears and fly-wheel are in motion, as the motion of the parts within the housing cause the oil to spatter about and part thereof will fall in the pan and return to the bearings through the conductors.

Having fully described our invention, we claim and desire to protect by Letters Patent:

1. In a vehicle transmission, a casing, a drive shaft therein, gears slidable on the drive shaft, and a unit removably mounted in the casing and comprising relatively spaced end brackets, a counter shaft mounted solely in said brackets, a reverse shaft mounted solely in said brackets, gears on the counter shaft, gears on the reverse shaft, arms cooperating with the slidable gears on the drive shaft to move the latter gears relative to the gears on the counter shaft and reverse shaft, and locking means for said arms carried by one of said brackets.

2. In a vehicle transmission, a casing, a drive shaft therein, gears slidable on the drive shaft, a bracket removably secured within the casing adjacent the forward end thereof, a second bracket removably secured in the casing adjacent the rear end thereof, a counter shaft mounted solely in said brackets, a reverse shaft mounted solely in said brackets, gears on the counter shaft, gears on the reverse shaft, arms cooperating with the slidable gears on the drive shaft to move the latter gears relative to the gears on the counter shaft and reverse shaft, and locking means for said arms carried by the bracket adjacent the rear end of the casing.

3. In a vehicle transmission, a mechanism adapted for insertion in or removal from the casing of the transmission as a unit, said mechanism including a forward bracket, a rear bracket, a counter shaft carried by and revoluble in the respective brackets, gears on the counter shaft, a reverse shaft carried by and revoluble in the respective brackets, gears on the reverse shaft, transmission gear shifting arms movable in one of the brackets, and a lock for said arms carried by one of the brackets.

FRANK J. POWERS.
CURTIS H. PARRISH.
JAMES E. O'HANLON.